United States Patent

Varan

Patent Number: 5,356,638
Date of Patent: Oct. 18, 1994

[54] METHOD AND APPARATUS FOR DEHYDRATION OF YOGURT DURING TRANSPORTATION AND STORAGE

[76] Inventor: Cyrus O. Varan, 19 Siempre Verde NE., Albuquerque, N. Mex. 87123

[21] Appl. No.: 29,617

[22] Filed: Mar. 11, 1993

[51] Int. Cl.$^5$ .................................................. A23C 23/00
[52] U.S. Cl. ........................................ 426/8; 426/43; 426/130; 426/394; 426/491; 99/456; 210/514
[58] Field of Search ................. 99/426, 496, 452, 496, 99/458; 426/8, 36, 38, 41, 43, 130, 583, 34, 394, 478, 491, 495; 210/469, 474, 482, 514, 521

[56] References Cited

U.S. PATENT DOCUMENTS

| | | |
|---|---|---|
| 709,319 | 9/1902 | Hankins . |
| 806,920 | 12/1905 | Rassi .................... 210/497.3 |
| 1,418,242 | 5/1922 | Fieldman . |
| 2,028,520 | 1/1936 | Phillips ................ 210/497.2 |
| 2,435,820 | 2/1948 | Diggs .................... 210/497.3 |
| 2,494,637 | 1/1950 | Stine ......................... 99/116 |
| 2,494,638 | 1/1950 | Stine ......................... 99/116 |
| 2,942,983 | 6/1960 | Sadler et al. ............. 99/116 |
| 3,032,877 | 5/1962 | Collins ....................... 31/46 |
| 3,140,185 | 7/1964 | Pinckney ................. 99/116 |
| 3,194,423 | 7/1965 | Mailoff ....................... 215/1 |
| 3,518,760 | 7/1970 | Winnie ....................... 31/46 |
| 3,602,992 | 9/1971 | Peters ......................... 31/46 |
| 3,783,166 | 1/1974 | Peters ....................... 426/491 |
| 3,802,332 | 4/1974 | Fassbender et al. .... 99/452 |
| 3,891,783 | 6/1975 | Robertson et al. ...... 426/478 |
| 3,892,172 | 7/1975 | Hakala ..................... 99/458 |
| 3,969,995 | 7/1976 | Krueger et al. ........ 99/458 |
| 4,003,490 | 1/1977 | Corbic .................... 220/22.3 |
| 4,058,630 | 11/1977 | Corbic ....................... 426/36 |
| 4,263,330 | 4/1981 | Streeter et al. ........ 426/414 |
| 4,289,793 | 9/1981 | Gustafson et al. ..... 426/491 |
| 4,291,064 | 9/1981 | Retzlaff .................. 426/397 |
| 4,334,465 | 6/1982 | Brockwell et al. ...... 99/454 |
| 4,627,984 | 12/1986 | Authelet et al. ......... 426/37 |
| 4,680,117 | 7/1987 | Freeman ................. 210/469 |
| 4,816,154 | 3/1989 | Hartley ................. 210/497.3 |

FOREIGN PATENT DOCUMENTS

| | | |
|---|---|---|
| 1800203 | 6/1969 | Fed. Rep. of Germany . |
| 2115102 | 10/1971 | Fed. Rep. of Germany . |
| 3215037 | 11/1983 | Fed. Rep. of Germany . |
| 2080024 | 11/1971 | France . |
| 2358102 | 2/1978 | France . |
| 2376803 | 8/1978 | France . |
| 2414866 | 8/1979 | France . |
| 2423977 | 11/1979 | France . |
| 2456467 | 12/1980 | France . |
| 2519840 | 7/1983 | France . |
| 1440307 | 6/1976 | United Kingdom . |

*Primary Examiner*—Robert A. Dawson
*Assistant Examiner*—W. L. Walker
*Attorney, Agent, or Firm*—Jacobson, Price, Holman & Stern

[57] ABSTRACT

A method and apparatus is provided for producing yogurt in a small container and in a manner by which the formed yogurt may have undesirable serum drained therefrom to dehydrate the yogurt prior to consumption thereof, all through the use of a single container and internal sieve and independent of removal of the yogurt from the original container subsequent to consumption of the yogurt.

5 Claims, 1 Drawing Sheet

METHOD AND APPARATUS FOR DEHYDRATION OF YOGURT DURING TRANSPORTATION AND STORAGE

BACKGROUND OF THE INVENTION

1. Field of the Invention

This invention relates to a method and apparatus for dehydration of yogurt during transportation and storage wherein a mixture of milk and curing agent is initially placed within a small container (to be marketed) and the container and mixture are maintained in a warmed state for approximately three to four hours till it is coagulated. After initial coagulation of the mixture within the container an upwardly opening closed bottom sieve type tube is displaced centrally downwardly within the mixture of the container. During this initial time period a cover may be placed upon the container and subsequent to this initial time period the containers may be refrigerated for shipment to a retail outlet or immediately shipped (under refrigeration) to a retail outlet.

The container is vibrated somewhat during shipment to a retail outlet and serum within the partially coagulated yogurt passes inwardly to the interior of the tube thus partially dehydrating the yogurt mixture within the container exteriorly of the sieve. When the container of yogurt is purchases by the ultimate user and transported to the purchaser's residence, additional serum separation from the yogurt mixture occurs and before the purchaser places the container within his or her refrigerator the cover is removed, the container is tilted to pore out the serum collected within the tube and the cover is reapplied. Thereafter, the container is placed within the refrigerator until time for the yogurt to be consumed. When the container is removed from the refrigerator for consumption of the yogurt therein and the top thereof is removed, the container again is tilted to pour out any further serum collected within the tube and the tube is subsequently withdrawn before consumption of the thus substantially fully dehydrated yogurt.

2. Description of Related Art

Various different forms of yogurt preparation and handling methods and apparatuses heretofore have been provided such as those disclosed in U.S. Pat. Nos. 709,319, 1,418,242, 2,494,637, 2,494,638, 2,942,983, 3,032,877, 3,140,185, 3,194,423, 3,518,760, 3,602,992, 3,783,166, 3,802,332, 3,891,783, 3,892,172, 3,969,995, 4,003,490, 4,058,630, 4,263,330, 4,289,793, 4,291,064, 4,334,465, 4,627,984 and 4,680,117 as well as several foreign patents including French Patent Nos. 2,358,102, 2,376,803, 2,414,866, 2,456,467, 2,423,977, 2,519,840 and 2,080,024 as well as German Patent Nos. 1,800,203, 2,115,102 and 3,215,037 and Great Britain Patent 1,440,307. However, these prior art references do not teach the disclosed apparatus and method whereby small quantities of yogurt may initially be formed in small (retail) containers for repeated dehydration of the yogurt prior to shipment, after purchase and immediately before consumption.

SUMMARY OF THE INVENTION

The apparatus of the instant invention concerns a small (retail) container in which to form yogurt and a tubular (test tube like) foraminated sieve to be inserted in an upright position within the container after the mixture of milk and curing agent begins to form solidified yogurt within the container. The mixture of milk and curing agent is maintained warm for three to four hours and it is during the latter part of this period that the test tube like sieve is inserted centrally into the partially solidified mixture within the container.

If the mixture exteriorly of the sieve has substantially solidified prior to placing the cover on the container, the container may be tilted to pour any serum collected within the sieve outwardly therefrom. Then, the container is shipped to a point of retail sale and the container is, naturally, vibrated during shipment so that more serum may pass through the foraminated walls of the sieve and into the interior of the latter to further dehydrate the yogurt within the container exteriorly of the sieve.

Then, upon a purchaser transporting the container to his residence and before placing the container of yogurt within a refrigerator or the like, the purchaser may remove the cover of the container and pour out any further serum collected therein and replace the cover. Thereafter, perhaps in a day or more, the purchaser will remove the container of yogurt from the refrigerator for consumption, remove the cap, again tilt the container to pour out any further serum which has collected within the sieve and then remove the sieve before consuming the dehydrated yogurt.

The main object of this invention is to provide an apparatus and method by which small quantities of yogurt may be initially formed within small retail containers and have excess serum separated from the yogurt and poured from the container two or three times before consumption of the yogurt from the container.

Still another important object of this invention is to provide a method and apparatus in accordance with the preceding and which will minimize transfer of yogurt being prepared from one container to another.

Still another important object of this invention is to provide a method and apparatus which will enable more desirable smaller quantities of dehydrated to be economically produced and packaged.

A final object of this invention is to provide a method and apparatus in accordance with the preceding objects and which will greatly simplify the manufacture, transport and sale of partially dehydrated yogurt in small containers thereof.

These together with other objects and advantages which will become subsequently apparent reside in the details of construction and operation as more fully hereinafter described and claimed, reference being had to the accompanying drawings forming a part hereof wherein like numeral refer to like parts throughout.

DESCRIPTION OF THE PREFERRED EMBODIMENT

Figure 1:
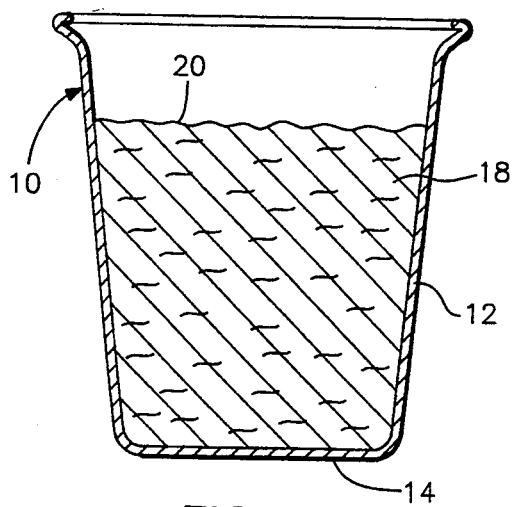
FIG. 1 is a vertical sectional view of a typical single serving container for yogurt and wherein a quantity of a mixture of milk and culture has been poured to a predetermined level.

For reasons related to flavor and the distribution of heat, yogurt is preferably manufactured and coagulated in small shipping containers.

Yogurt is composed of two parts: (a) the curds and (b) the whey or serum which comprises a rather small portion of the total volume of yogurt. The serum is, generally speaking, of poor taste. Removal of the serum improves the taste of the yogurt and results in a thicker and more cream-like yogurt for common use or for use as a snack dip, salad dressing and in other recipes.

The removal of serum by centrifugal methods from large supplies of yogurt is feasible, but is not practical because the added cost involved in the transfer of yogurt from small containers to strainers and back into shipping containers cannot be justified.

The curing of yogurt prior to coagulation in porous shipping containers also poses a problem since some of the milk (while still fluid) is lost and, more importantly, because the perforations become clogged by curd formations inside the pores during the coagulation process and thus drainage of the serum is aborted.

Serum also has been removed by employing a sack made of fabric which allows drainage. However, the loss due to adherence of the residue to the cloth, the mess of such an operation, the cost of the fabric sacks and the limitation of the technique to small operations, are all drawbacks to this method.

Some previous attempts have included the use of a cone strainer to replace the cloth sack which can be used by home owners who wish to dehydrate the yogurt they have purchased. Thus, it is not adaptable for broad commercial use prior to sale of yogurt.

Other methods of manufacture employ a special design of shipping container having two chambers interconnected by porous screen. After the yogurt is manufactured and coagulated in the first container, the cup is inverted so serum liberated during coagulation is drained into the second chamber which passing through the divider screen. The cost of manufacturing a cup with a comparatively complex dual chamber has resulted in extreme limited use of this method.

With the instant invention, prior to closing the cover of substantially fully coagulated yogurt for shipment, a disposable porous tube sieve, with its lower end closed, is downwardly introduced into the coagulated yogurt container substantially in the center thereof. Using the principle of a water well, the serum is partially drained into the test tube or sieve prior to and during shipment and subsequent storage before retail sale. The vehicular shaking and vibration during transport will serve to accelerate the process of dehydration, thereby improving the efficiency of the operation. The serum may be drained by a simple tilting of the container after it is opened by the purchaser and before the purchaser places the container within a refrigerator or the like for future consumption. In such instance, the serum may be further drained immediately before consumption. However, if the yogurt is retailed purchased for immediate consumption, substantially all of the liberated fluid may be drained by a simple tilting of the container after it is opened for consumption and then removing the sieve. Of course, the test tube-like sieve may also be removed without first tilting the container to drain any collected serum therein.

Porous test tubes or sieves made of styrofoam or other similar material enjoy an extremely low cost and, if necessary, could be designed for reuse. Further, the present method and apparatus enables a manufacturer already set up to produce yogurt in small containers to readily practice both the apparatus and the method of this invention. The simplicity of the concept involved and the economy of operation are advantages of the present invention.

Figure 2:
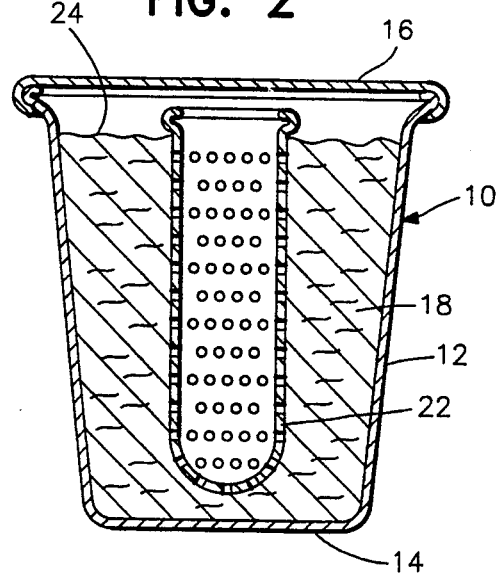
FIG. 2 is a vertical sectional view similar to FIG. 1 but illustrating in which an upright, test tube like sieve is subsequently inserted downwardly into the partially formed and coagulated yogurt within the container and a cover is provided over the cover of the container for shipment.

Referring now more specifically to FIG. 1, FIG. 1 illustrates a cup-like container 10 including peripheral side walls 12 and a closed bottom 14. In FIG. 2 of the drawings it may be seen that the container 12 may be provided with a cover 16 removable secured over the open upper end of the container 10.

Figure 5:
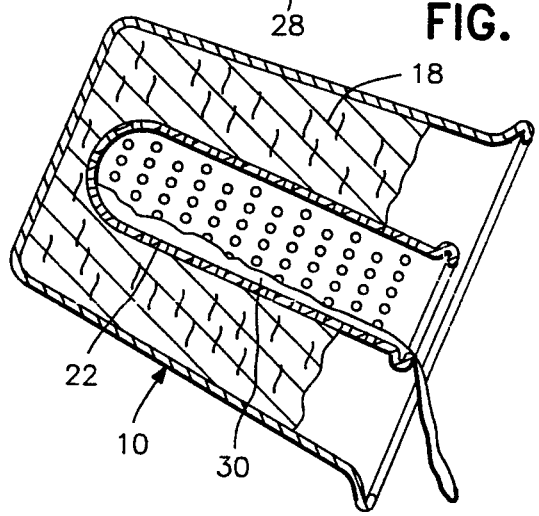
FIG. 5 is a vertical sectional view similar to FIG. 2 but with the cover of the container removed and the container tilted to pour the serum collected within the sieve outwardly therefrom.
Figure 6:
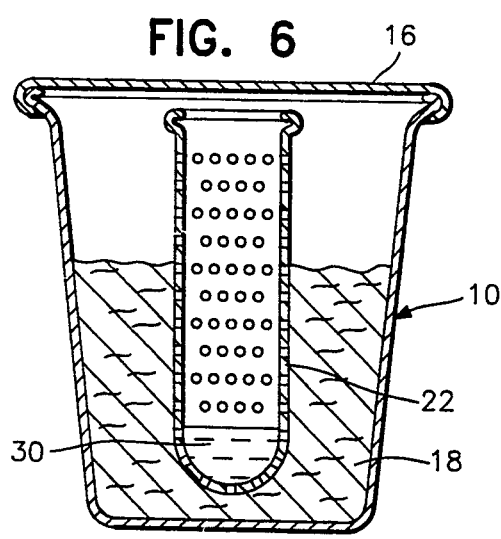
FIG. 6 is a vertical sectional view similar to FIG. 4 illustrating the final collection of serum within the test tube like sieve before again emptying the sieve in the manner shown in FIG. 5 and removing the sieve immediately prior to consumption of the yogurt.

When forming yogurt in accordance with the present invention a liquid mixture 18 of milk and a curing agent is poured into the container 10 to the approximate level 20 illustrated in FIG. 1. The mixture 18 is then maintained warm for approximately three to four hours in order to at least partially carry out the coagulation or solidifying of the mixture 18. Thereafter, or during the aforementioned three to four hour period a test tube-shaped sieve or container 22, closed at its bottom and having many small diameter pores therein, is downwardly inserted into the mixture or partially coagulated yogurt 18 with the sieve 22 generally centered in the container and extending from a point slightly above the elevated level 24 of the mixture 18 to a point spaced slightly above the bottom 14, the sieve 22 being constructed of a porous material such as styrofoam. Thereafter, the cover 16 may be applied over the open top of the container 10 and the container 10 may be bulk packaged with other containers for transport. However, if the yogurt 18 has at least substantially coagulated, before applying the cover 16 the container 12 may be tilted as shown in FIG. 5 to pour, by gravity, any serum 30 which has collected in the sieve 22. Further, although the sieve or container 22 is illustrated as test tube shaped, it may taper downwardly or upwardly, or include a bulbous lower end. Further, other shapes may be used for different yogurts.

Figure 3:
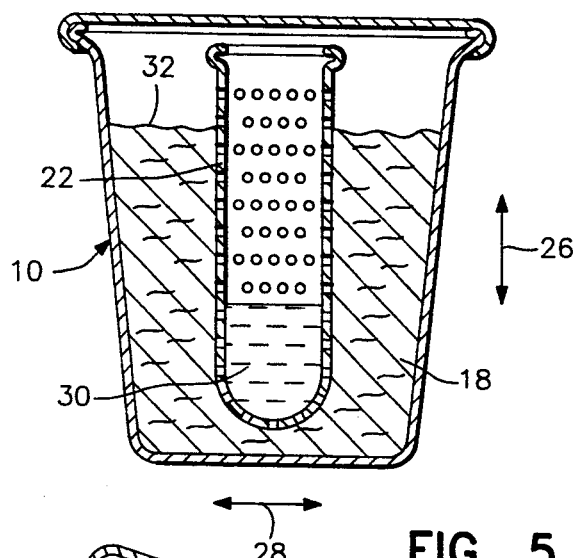
FIG. 3 is a vertical sectional view substantially identical to FIG. 2 but representing a quantity of serum which has collected within the bottom of the sieve within the container during shipment of the container to a retail outlet.
Figure 4:
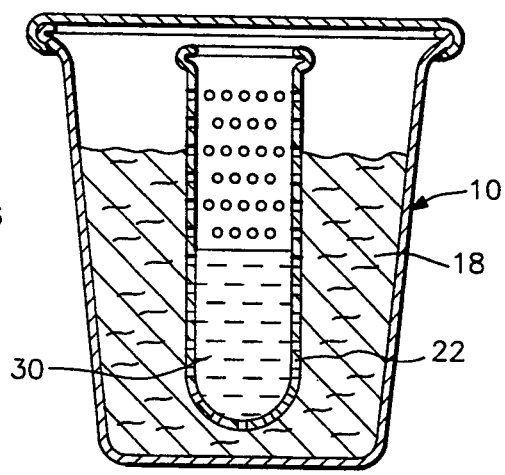
FIG. 4 is a vertical sectional view substantially identical to FIGS. 2 and 3 but illustrating the accumulation of additional serum within the test tube like sieve during cool storage in a retail outlet.

During bulk packaging with other containers and bulk transport to a distributor and or subsequently to a retailer, the container 10 is subjected to up and down motions 26 and back and forth horizontal motions 28, all of which facilitate the passage of liquid serum 30 from the mixture 18 inwardly through the walls of the sieve 22 for collection in the bottom of the sieve 22, thus partially lowering the level of the partially dehydrated yogurt to the level 32 illustrated in FIG. 3.

After delivery to a retail outlet the container 10 is stored in a cool environment and an additional amount of serum 30 passes from the mixture 18 through the walls of the sieve 22 and into the interior of the latter.

Assuming that the container of substantially coagulated yogurt mixture 18 is then purchased for immediate consumption, the purchaser removes the cover 16, tilts the container 10 to the position thereof illustrated in FIG. 5 and then removes the sieve 22 preparatory to consumption of the substantially fully coagulated yogurt 18. However, in the event the purchaser desires to take the container 10 home for subsequent consumption of the yogurt 18, when the purchaser reaches his home he may then carry out the process step illustrated in FIG. 5 and reapply the cover 16 for further storage of the container 10 in his refrigerator. Then, when the purchaser desires to consume the yogurt 18, the container 10 is removed from the refrigerator, the cover 16 is removed and the container 10 is again tilted to pour therefrom the final amount of serum 30 which has passed inwardly through the walls of the sieve 22 subsequent to the container 10 being placed within the refrigerator. Of course, the container 10 may then be righted and the sieve 22 may be removed therefrom to enable easy consumption of the substantially fully coagulated and serum free yogurt 18.

As pointed out hereinbefore, yogurt which has not been thus dehydrated is less desirable in taste than yogurt saturated with serum. Further, it has been found that yogurt manufactured in large quantities, even if subsequently substantially dehydrated, has a taste which is less desirable than yogurt which has been manufactured in small quantities.

Thus, the apparatus and method of the instant invention provides a unique manner for inexpensively producing yogurt in small quantities and in a manner in which the undesirable serum may be separated from the yogurt and repeatedly drained from the yogurt container before consumption.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An upright open top cup in which a mixture of milk and a curing agent for forming yogurt may be placed for coagulation therein and from which undesirable serum may be drained from the yogurt prior to consumption of the dehydrated yogurt, said cup including peripheral side walls and being closed at its bottom by a bottom wall extending between said peripheral side walls, a removable cover for said open top of said cup, an upright open top, peripheral walled and test tube-like sieve closed at its bottom and constructed of porous material, said sieve being of a height slightly less than the height of said cup and being of a diameter considerably less than the diameter of the interior of said cup, said sieve being downwardly insertable within at least partially coagulated yogurt contained within said cup to a level below the open top of said cup with the bottom of said sieve spaced above said cup bottom and the top of said sleeve spaced above the elevated level of yogurt in said cup and below said cover when the latter is placed in position to close the top of said cup.

2. The cup of claim 1 wherein said side walls taper downwardly.

3. The method of forming small quantities of coagulated, substantially serum free yogurt in small containers in which the formed yogurt is to be shipped and marketed and from which the yogurt is ultimately to be consumed, said method including (1) providing an open to peripheral walled cup and a reclosable cover for said cup as well as a generally test tube-shaped sieve open at its top and closed at its bottom and of a height at least slightly less than the height of the interior of said cup and a diameter considerably less than the diameter of the interior of said cup and with said sieve being constructed of porous material, (2) placing a mixture of warm milk and curing agent within said cup to a level above which an unoccupied volume of the interior of said cup remains at least slightly greater than the external volume of said sieve, (3) allowing said mixture to at least partially coagulate, (4) centrally downwardly inserting said sieve into said mixture to a level with the bottom of said sieve spaced slightly above the bottom of said cup and the top of said sieve above the then elevated level of said mixture, (5) maintaining said mixture warm for a period of time to substantially complete the coagulation of said mixture, (6) securing said cover over said cup open top, transporting said cup to a retail outlet while maintaining said cup upright, (7) having a customer purchase said container, (8) removing said cover, (9) tilting said cup to gravity pour serum collected within said sieve therefrom, (10) righting said cup and (11) upwardly removing said sieve from said yogurt before consumption thereof.

4. The method of claim 3 including (A) tilting said cup to gravity pour serum collected within said sieve from the latter subsequent to step (6).

5. The method of claim 4 including, subsequent to step (7), transportation of said cup to the purchasers residence, (B) removing said cover, (C) tilting said cup to gravity pour serum collected within said sieve therefrom, righting said cup, (D) replacing said cover, (E) temporarily placing said cup in cool storage and (F) removing said cup from said temporary cool storage before thereafter continuing with steps 8–11.

* * * * *